United States Patent

Heaslip et al.

[11] Patent Number: 5,930,832
[45] Date of Patent: Jul. 27, 1999

[54] APPARATUS TO GUARANTEE TLB INCLUSION FOR STORE OPERATIONS

[75] Inventors: Jay Gerald Heaslip, Williston; Robert Dov Herzl; Arnold Steven Tran, both of South Burlington, all of Vt.

[73] Assignee: International Business Machines Corporation, Armonk, N.Y.

[21] Appl. No.: 08/660,560

[22] Filed: Jun. 7, 1996

[51] Int. Cl.⁶ .................................................. G06F 12/10
[52] U.S. Cl. .......................................... 711/207; 395/392
[58] Field of Search .................................. 395/392, 390; 711/207

[56] References Cited

U.S. PATENT DOCUMENTS

| | | | |
|---|---|---|---|
| 5,191,649 | 3/1993 | Cadambi et al. | 395/200 |
| 5,206,945 | 4/1993 | Nishimukai et al. | 395/425 |
| 5,226,126 | 7/1993 | McFarland et al. | 395/375 |
| 5,283,886 | 2/1994 | Nishii et al. | 395/425 |
| 5,564,111 | 10/1996 | Glew et al. | 395/185.06 |

OTHER PUBLICATIONS

Computer Dictionary. Second Edition. Microsoft Press. 1994. p. 377.
Superscalar Microprocessor Design. Michael Johnson. Prentice Hall. 1991. pp. 26–28 and 50–53.
IBM Technical Disclosure Bulletin, "Special Serialization for "Load–with–Update" Instruction to Reduce the Complexity of Register Renaming Circuitry", vol. 37, No. 10, Oct. 1994, pp. 59–60.

*Primary Examiner*—Eddie P. Chan
*Assistant Examiner*—Kevin Verbrugge
*Attorney, Agent, or Firm*—Susan Murray; Joseph P. Abate

[57] ABSTRACT

A computer system includes a processor and a cache and memory management unit. The processor includes a means for retiring instructions in program order. The cache and memory management unit includes means for detecting when a translation has been evicted from a lookaside buffer and means for communicating eviction information to the means for retiring instructions in program order. The means for retiring instructions in program order includes means for holding a storage related instruction which causes a miss in the lookaside buffer or in the cache in a first pass of execution until the instruction becomes the oldest storage related instruction in program sequence and further includes means responsive to the eviction information for flushing all storage related instructions except the current storage related instruction. The system avoids the occurrence of misses in the buffer late in execution (e.g., PASS 2 or later), thus avoiding a necessity for complex recovery provisions.

6 Claims, 6 Drawing Sheets

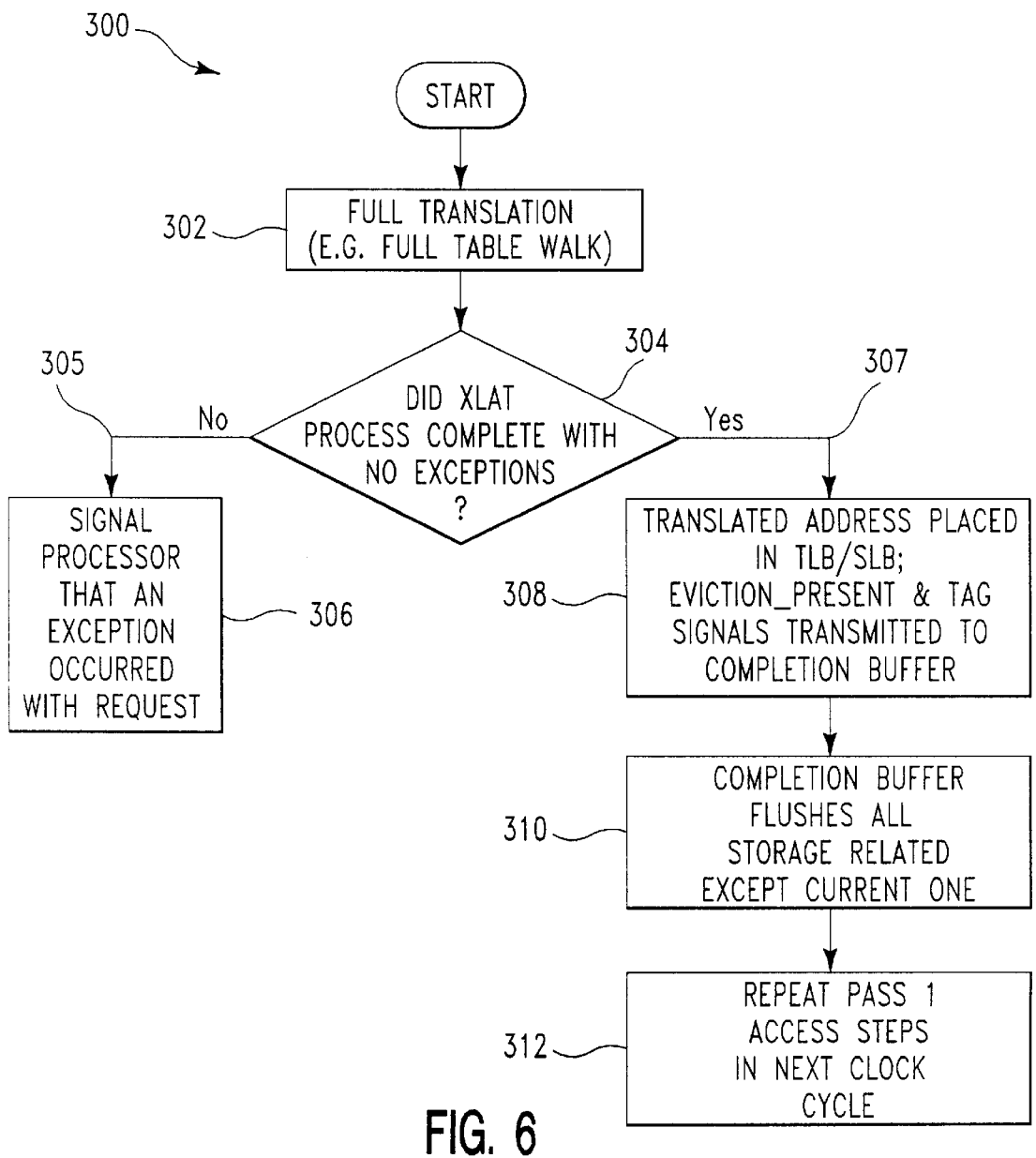

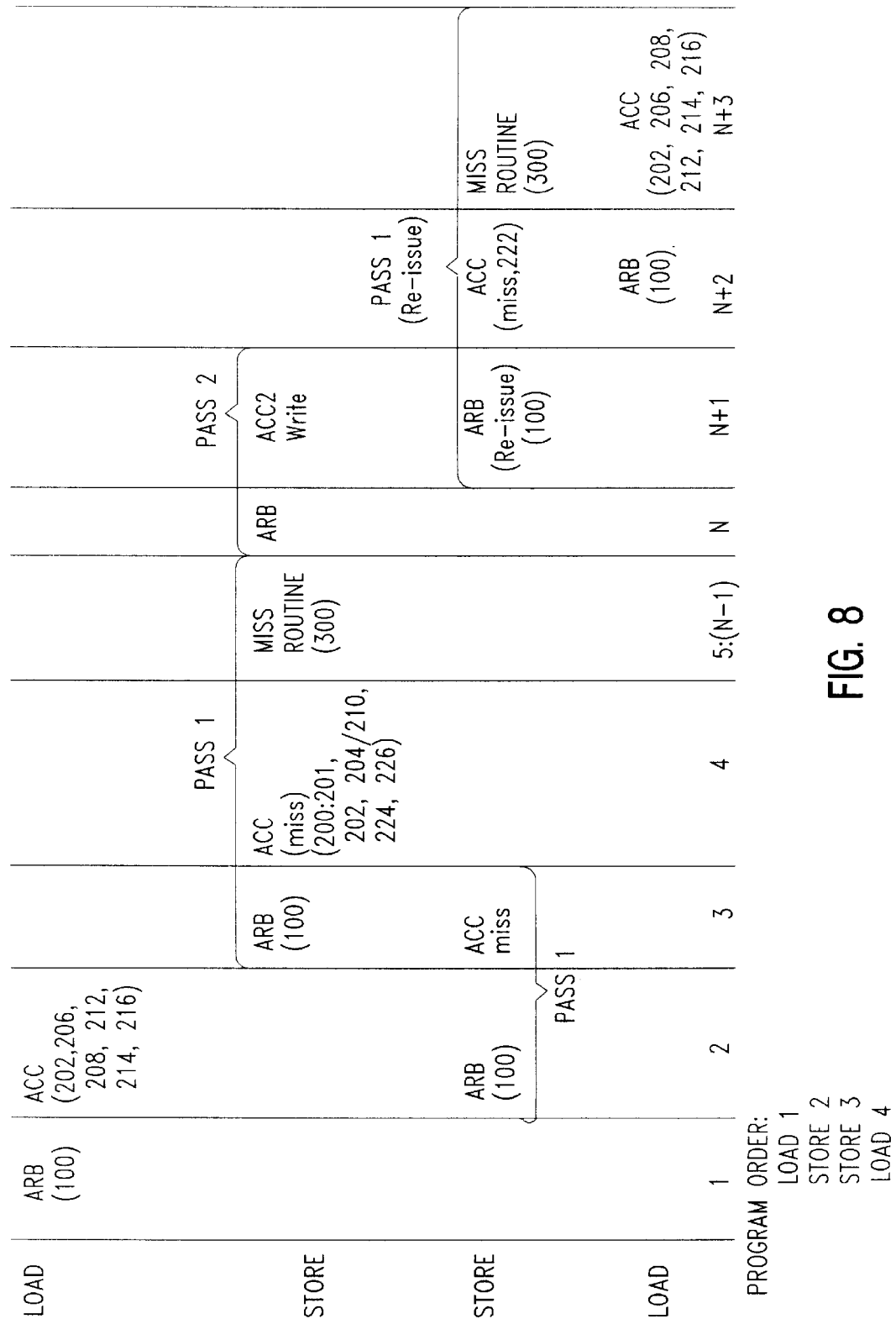

APPARATUS TO GUARANTEE TLB INCLUSION FOR STORE OPERATIONS

FIELD OF THE INVENTION

This invention relates in general to computer processors and more specifically to pipelined computer processors performing out of order instruction execution.

BACKGROUND OF THE INVENTION

State of the art computer processors employ a variety of techniques to accelerate performance. One such technique, referred to as pipelining, permits a processor to execute more than one instruction at a given time by executing instructions in multiple stages. For example, an initial stage may fetch instructions from memory, a second stage may decode instructions, a third stage may locate instruction operands, and so forth. Since each stage is able to operate on different instructions, multiple instructions can be executed at the same time, thus shortening the apparent time to execute any given instruction. The goal is for each stage to complete all associated operations on an instruction in a single clock cycle, such that instructions continuously advance to the next pipeline stage and an instruction completes execution each clock cycle. An extension of the pipelining concept, referred to as superpipelining, provides for pipeline stages to also have a pipelined (e.g. staged) structure comprising several sub-stages and provides further opportunity for enhancing processor performance.

Certain events may prevent a pipeline stage from completing its operations in a single clock cycle. One such event is the occurrence of a change of flow (COF) instruction, for example a branch, jump or call/return instruction. A branch instruction requires a branch to be taken or not taken, depending on whether predetermined conditions are met. Jump and call/return instructions are unconditional (always taken). Taken branches and unconditional change of flow instructions interrupt the instruction stream (e.g. "stall" the pipeline) to cause instruction fetch to proceed from a new target instruction, and thus have a potential to slow performance.

Another event which may cause a pipeline stall is an exception. An exception is an interruption in program flow resulting from the execution of instructions, for example, a floating point overflow.

One technique used to avoid or minimize such pipeline stalls is speculative execution. Speculative execution, also referred to as out-of-order execution, refers to a practice of allowing instructions to be executed out of their original programmed sequence on the speculation that the result will be needed. For example, in the case of an instruction sequence including a branch operation, the processor may predict whether the branch will be taken or not taken and speculatively continue to execute instructions based on the prediction. Similarly, in the case of an instruction sequence including a floating point instruction, instructions which follow the floating point instruction may be allowed to advance prior to the completion of the floating point instruction. If subsequent events indicate the speculative instruction would not have been executed (e.g. the branch prediction was incorrect, or a floating point error occurred), the processor abandons any result the instruction produced and returns execution to the point before speculative execution occurred. The rationale behind out-of-order execution is that the increase in efficiency realized by avoiding pipeline stalls outweighs the loss of efficiency due to redundant execution which may need to occur to clean-up after false starts.

In processors employing out-of-order execution, there is normally provided a completion buffer or other similar means which is used to manage the results of the out-of-order execution so that the instructions appear to be executed sequentially. The completion buffer may use instruction tags which are numbers assigned to instructions at the start of execution, and which are carried through execution to track program order. When an instruction finishes execution, the results are stored in a temporary buffer while the completion buffer keeps track of the program sequence. When the completion buffer determines that a particular instruction is the next in the programmed sequence, it allows the results of the instruction stored in the temporary buffer to be stored permanently (e.g. in designated registers or memory).

Another technique used to accelerate performance of a processor involves memory addressing. The use of real addresses and virtual addresses are known in the art. Real addresses, also referred to as physical addresses, represent actual physical locations in memory. Physical memory is generally divided into relatively large blocks referred to as segments, which are in turn divided into smaller blocks referred to as pages. Virtual addresses are temporary addresses employed as a convenience for programming so that the programmer need not keep track of which physical addresses are in use and which are available; instead the processor keeps track of the availability of each physical address as well as the correspondence between virtual and physical addresses. A variety of schemes for translating between virtual addresses and real addresses are also known. Normally, one or more tables of virtual addresses (or portions thereof) and the corresponding real address (or portions thereof) are stored in memory. Translation schemes may involve a combination of calculation steps along with segment table searching and page table searching (e.g. "page table walk"). Since segment and page table searching can be quite time consuming, it is known in the art to store a number of recently used entries from the segment and page tables in separate smaller-sized buffers (e.g. segment lookaside buffer (SLB) and/or translation lookaside buffer (TLB)), so as to decrease access time for addresses that are frequently used.

In a pipelined processor employing speculative execution, speculative execution of storage related instructions, such as LOAD and STORE instructions, can create problems. A LOAD instruction receives an operand from a target address in cache or memory, while a STORE instruction writes an operand to a target address in cache or memory.

FIG. 1 depicts a block diagram of a relevant portion of an exemplary prior art pipelined processor for speculatively executing LOAD/STORE instructions. More particularly, shown in FIG. 1 are a processor core 10, portions of which are further described below, and a cache and memory management unit (CMMU) 12. The processor core 10 executes instructions while the cache and memory management unit 12 controls access to cache and memory. Included in the processor core 10 is at least one load store unit (LSU) 14 (two are shown as 14a and 14b) for executing LOAD and STORE instructions, a completion buffer 16 for managing the results of out-of-order execution driven by the LSU's 14a and 14b and other execution units, and a writeback unit 18, a temporary buffer for holding pending store operands. Included in the cache and memory management unit 12 is a cache 20 and its associated tag directory, a cache controller 21, a memory management unit 22, and a translation unit 24 for translating between real and virtual addresses. The translation unit 24 may include, for example, a translation lookaside buffer (TLB) 26 and/or a segment lookaside buffer (SLB) 28 for accelerating translation of virtual addresses to real addresses as described above. The translation unit 24 also normally includes circuitry for translating addresses not found in the TLB 26 and SLB 28 (e.g. circuitry for conducting a page table walk).

The prior art system shown in FIG. 1 might execute STORE instruction as follows. The execution is conceptually broken into three pipelined stages (not shown as distinct hardware stages). The first stage is an arbitration stage (ARB) in which the cache controller 21 determines for each clock cycle which outstanding cache request will be serviced in the current clock cycle. An instruction cannot complete the ARB stage unless both the cache 20 and the TLB 26/SLB 28 are available. In the second stage, or the access stage (ACC), the cache and memory management unit 12 performs virtual memory address translation to form a real address by means of the TLB 26 and/or the SLB 28 and also checks for protection violations (a protection violation results when an access request is inconsistent with a security classification assigned to a particular portion of memory). The resultant real address is then used by the CMMU 12 to interrogate the cache tag directory for the translated address. If there is a "hit" in the cache 20 and in the TLB 26 and SLB 28 (e.g. the translated address is found and is not write protected), the cache 20 and/or external memory (not shown) is written with the data (STORE). If the real address is not found in the TLB/SLB 26/28, a miss signal is returned to the processor core 10. A third stage (MISS stage) handles misses arising during the access stage. That is, a full translation is performed (e.g. including full table walk) and the SLB 28 and TLB 26 are updated prior to storing the data.

For processors employing speculative execution, STORE instructions are normally executed in two passes. A first pass (PASS1) involves the arbitration stage (ARB), as described above, and aspects of the access stage (ACC1). More particularly, ACC1 includes address translation as described above, as well as cache interrogation so as to "preapprove" the STORE. A second pass (PASS2) involves the arbitration phase (ARB) and the access stage (ACC2), resulting in an unconditional write to the translated target address in cache and/or memory.

In a processor employing speculative execution, an indeterminate number of clock cycles may occur between the end of PASS1 and the beginning of PASS2 in executing a STORE instruction, thereby providing an opportunity for intervening operations (e.g. such as a LOAD instruction or another PASS1 store instruction) to alter the contents of the SLB/TLB 26/28. Thus, if in PASS1 there was a SLB/TLB 26/28 hit (e.g. address found in SLB/TLB), the translated address needed in PASS2 may been overwritten by intervening out-of-order operations, prior to the beginning of PASS2.

When the translated address in the SLB/TLB 26/28 is overwritten by intervening operations, recovery may require a number of complex operations. First, a full table-walk translation must be performed to derive the appropriate address, and the STORE instruction must be retried using the translated address. After retrying the STORE operation, the data may need to be sent to memory, as well as the cache, to insure coherence between cache and memory.

In addition, instruction fetching may need to be suspended because the information needed to properly manage STORES to the instruction stream (e.g. refers to instructions which alter instructions later in the program sequence, in other words, "self-modifying code") is unavailable. More particularly, after completing a STORE instruction, the cache is normally checked for the physical address to which a result is being stored (e.g. snooping) in order to determine whether the STORE instruction has changed an instruction which follows it in program order. If the physical address is found, the cache halts instruction fetching and either stores the new data into the appropriate line or invalidates the appropriate line, depending on the desired cache protocol (e.g. write-through, write-back); if the address is not found, instruction fetching continues and the STORE is completed. In the case of a STORE instruction which misses the TLB/SLB in PASS2, the snooping operation cannot occur because the physical address needed is not available; in addition the virtual address may no longer be available. Therefore, instruction fetching must be suspended until after the full translation occurs.

In addition, until the full translation occurs, external snooping or, in other words, bus snooping (e.g. by devices peripheral to the processor) may need to be suspended since a physical address may be required for external snooping.

Each of these operations requires complicated logic to implement, which adds delay to critical paths, and takes up valuable silicon real estate, all for an event that occurs relatively infrequently.

An alternative to the complex controls described above is to maintain in a buffer the real address for all STORE instructions in progress until after completion. In a superscalar superpipelined processor, such a buffer would require a large number of registers, each having enough bits to hold a real address, thus requiring additional space as well as complex logic to manage the buffer.

Another alternative would be to structure STORE instructions so that PASS2 occupies 2 clock cycles. More particularly, such a scheme might in a first cycle translate an address that missed in PASS 1 (e.g. perform full page table walk) and in a second cycle perform an unconditional write to cache or memory. Such a scheme, however, significantly hampers the performance of the processor.

SUMMARY OF THE INVENTION

It is an object of the present invention to provide a pipelined processor which simplifies handling of speculatively executed storage related instructions.

It is a further object of the present invention to provide a pipelined processor, and method for operating the same, which avoids the unavailability of a real address after the first pass of a multi-pass speculative execution of a storage related instruction.

The present invention is directed to a method of executing storage related instructions by a processor in conjunction with a cache and memory management unit, the storage related instructions having a target virtual address to which data is to be stored or from which data is to be retrieved, the processor including a means for retiring instructions in program order. The method includes a first pass of execution including the steps: a) selecting a current storage related instruction from a plurality of storage related instructions requiring access to the cache and memory management unit; b) accessing a lookaside buffer for translating the target virtual address of the current storage related instruction to a real address, wherein the absence of the target virtual address results in a miss in the lookaside buffer and the presence of the target virtual address results in a hit in the lookaside buffer; c) accessing the cache and cache tag with the real address, wherein the absence of the real address results in a cache miss and the presence of the real address results in a cache hit; d) in response to a miss in one of the lookaside buffer or the cache and memory management units, entering a miss recovery stage only if the instruction causing the miss is the oldest storage related instruction in program order.

If the instruction causing the miss is not the oldest storage related instruction in program order, it is held for reissue when it becomes the oldest storage related instruction in program order.

The TLB/SLB miss recovery stage in the first pass of execution may include the steps of: a) performing a full address translation to derive the real address; b) updating the lookaside buffer with the real address; c) flushing the means for retiring instructions in program order of all storage related instructions except the current storage related instruction; d) repeating the first pass of execution beginning with the first access stage. Alternatively, the step of flushing can be performed conditionally or selectively.

According to the invention a second pass of execution for a STORE instruction may include the steps of: a) selecting a current storage related instruction from a plurality of storage related instructions requiring access to the cache and memory management unit; and b) unconditionally storing the data to the real address of memory or cache.

In another aspect of the invention a computer system includes a processor and a cache and memory management unit, the processor including a means for retiring instructions in program order, the cache and memory management unit including a cache and further including a lookaside buffer for translating virtual addresses to and from real addresses, the processor and cache and memory management operating to execute storage related instructions in multiple passes of execution. The cache and memory management unit includes means for detecting when a translation has been evicted from the lookaside buffer and means for communicating eviction information to the means for retiring instructions in program order. The means for retiring instructions in program order includes means for holding a storage related instruction which causes a miss in the lookaside buffer or in the cache in a first pass of execution until the instruction becomes the oldest storage related instruction in program sequence and further includes means responsive to the eviction information for flushing all storage related instructions except the current storage related instruction.

BRIEF DESCRIPTION OF THE DRAWINGS

The subject matter which is regarded as the invention is particularly pointed out and distinctly claimed in the concluding portion of the specification. The invention, however, may best be understood by reference to the following detailed description of the preferred embodiments and the accompanying drawings in which:

FIG. 5 is a flow diagram of a second pass through the access stage shown in FIG. 2 for STORE instructions.

FIG. 6 is a flow diagram of the miss recovery stage shown in FIG. 2.

FIG. 8 is a high level timing diagram of an exemplary sequence of storage instructions performed in accordance with the method and apparatus of the present invention.

DETAILED DESCRIPTION OF THE PREFERRED EMBODIMENT

The method and apparatus of the present invention seek to solve the above-mentioned problems by preventing the unavailability in PASS 2 of the execution of a STORE instruction of a real address. More particularly, the method and apparatus of the present invention prevent SLB/TLB misses from occurring in PASS2 of the execution of a STORE instruction, rather than managing SLB/TLB misses after they occur. Since SLB/TLB misses in PASS2 have been found to occur very infrequently in prior art designs, the ability to manage misses after they occur requires relatively large amounts of costly chip space for complex control logic which is generally only rarely used. The present invention avoids the need for such complex and space consuming logic for recovering from a SLB/TLB miss in PASS2.

Figure 1:
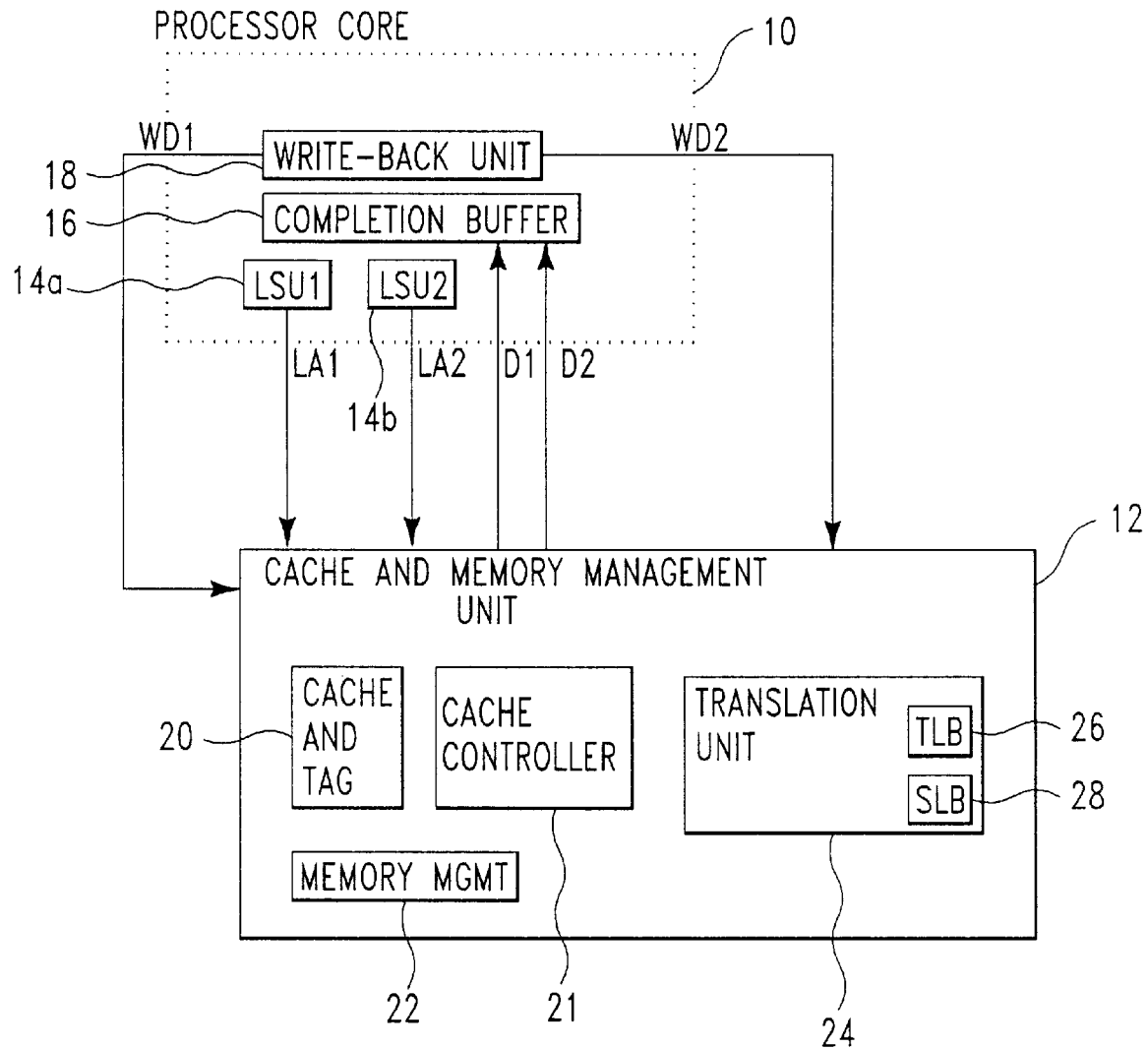
FIG. 1 is a block diagram of a portion of an exemplary prior art processor including a portion of the processor core and a cache and memory management unit.
Figure 7:
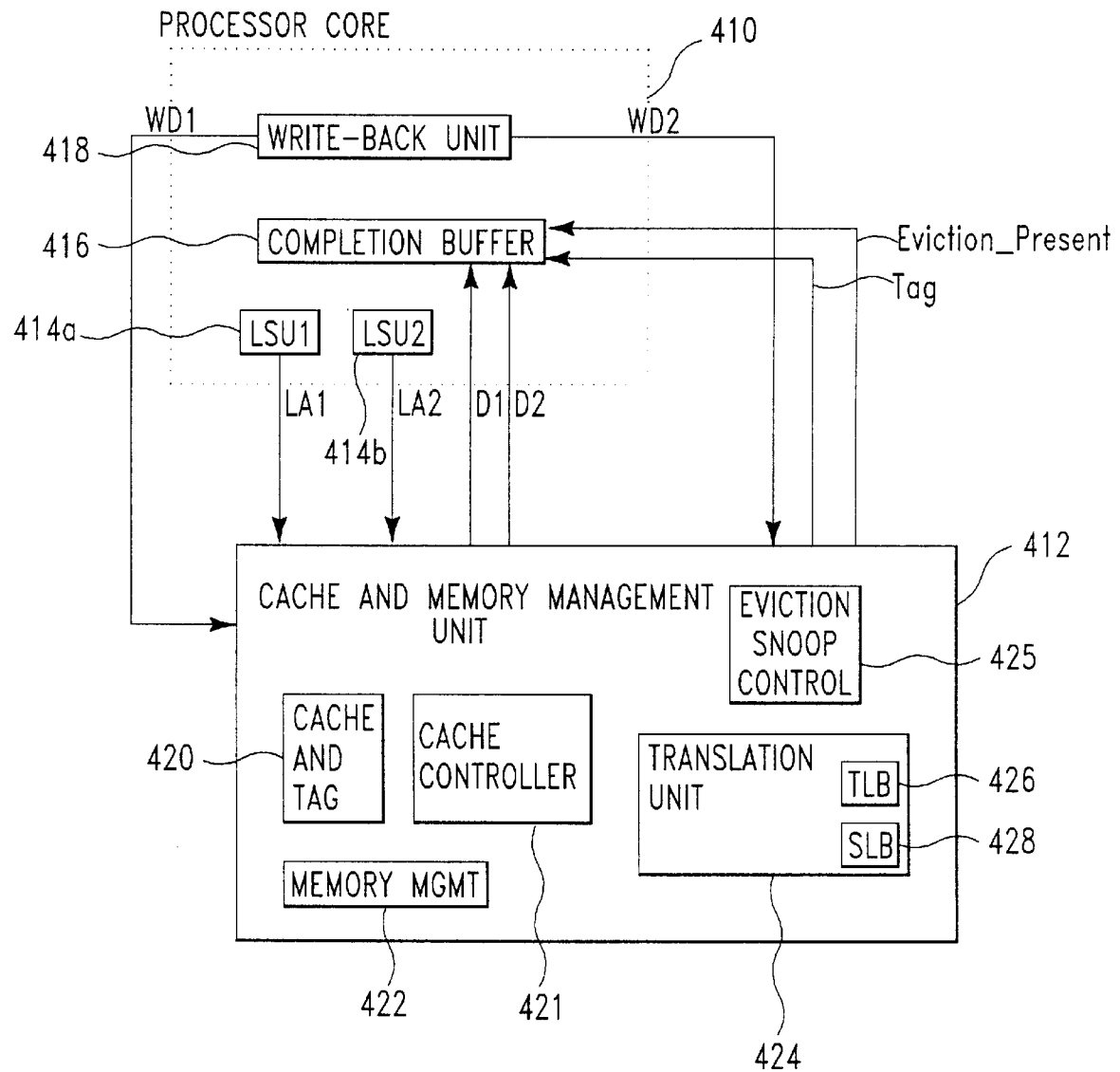
FIG. 7 is a block diagram of a portion of an exemplary processor according to the present invention including a portion of the processor core and a cache and memory management unit.

FIG. 7 is a block diagram of a portion of an exemplary processor according to the present invention including a portion of the processor core and a cache and memory management unit. Like-numbered reference numeral in FIGS. 1 and 7 indicate similar elements having similar functions. FIG. 7 additionally includes features not present in FIG. 1. More particularly, the CMMU includes TLB Eviction Snoop Control Logic 425. The Completion Buffer 416, or similar means for retiring instructions in program order, includes logic responsive to the signals EVICTION_PRESENT and TAG.

Figure 2:
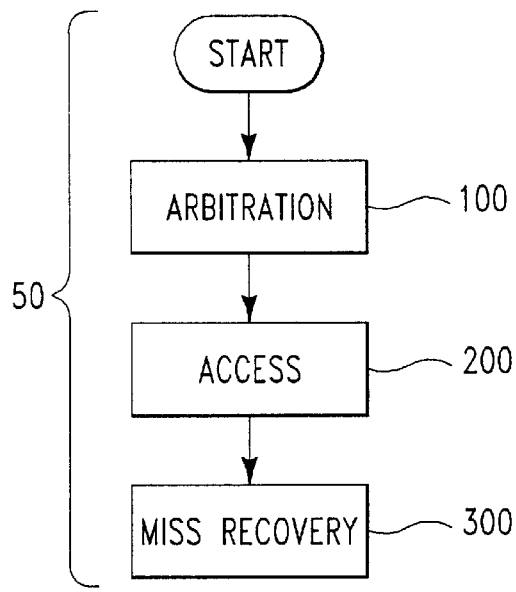
FIG. 2 is a high level flow diagram of the method of the present invention.

With reference to FIG. 2, shown therein is a high level flow diagram 50 of the method of the present invention. The method includes an arbitration step at block 100, an access step at block 200 and a miss recovery step at block 300, and may for some instructions require more than one pass through the identified steps, as will be explained below in further detail.

Figure 3:
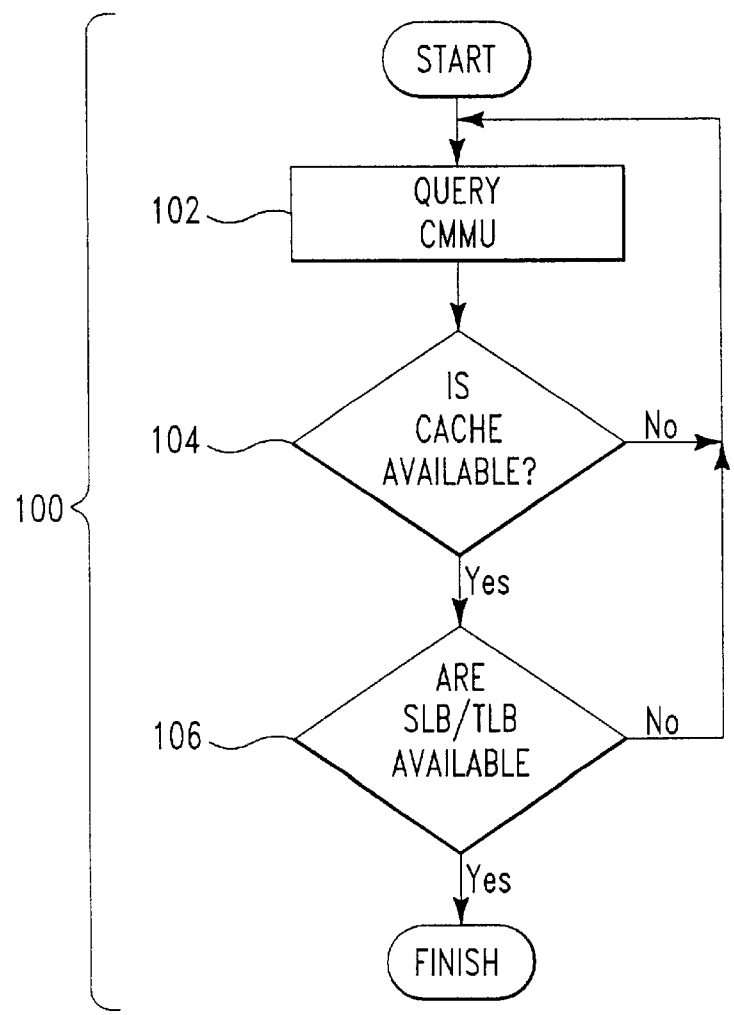
FIG. 3 is a flow diagram of the arbitration stage shown in FIG. 2.

FIG. 3 shows a flow diagram of the arbitration stage 100 shown in FIG. 2. With reference to FIGS. 3 and 7, at block 102 the CMMU 412 is queried by a LOAD/STORE UNIT 414 and the CMMU, more particularly, the cache controller 421, decides which outstanding request will be serviced in the current clock cycle (e.g. selects between requests from first and second load/store units and other execution units or external resources). Next the CMMU 412 tests to see if the cache 420, the SLB 428 and the TLB 426 are available, respectively in blocks 104 and 106. If any of the cache 420, the SLB 426 or the TLB 428, is not available, arbitration begins again. If each of the cache 420, the SLB 428 and the TLB 426 are available, arbitration is complete, and the instruction begins the ACC stage 200 in the next clock cycle.

Figure 4:
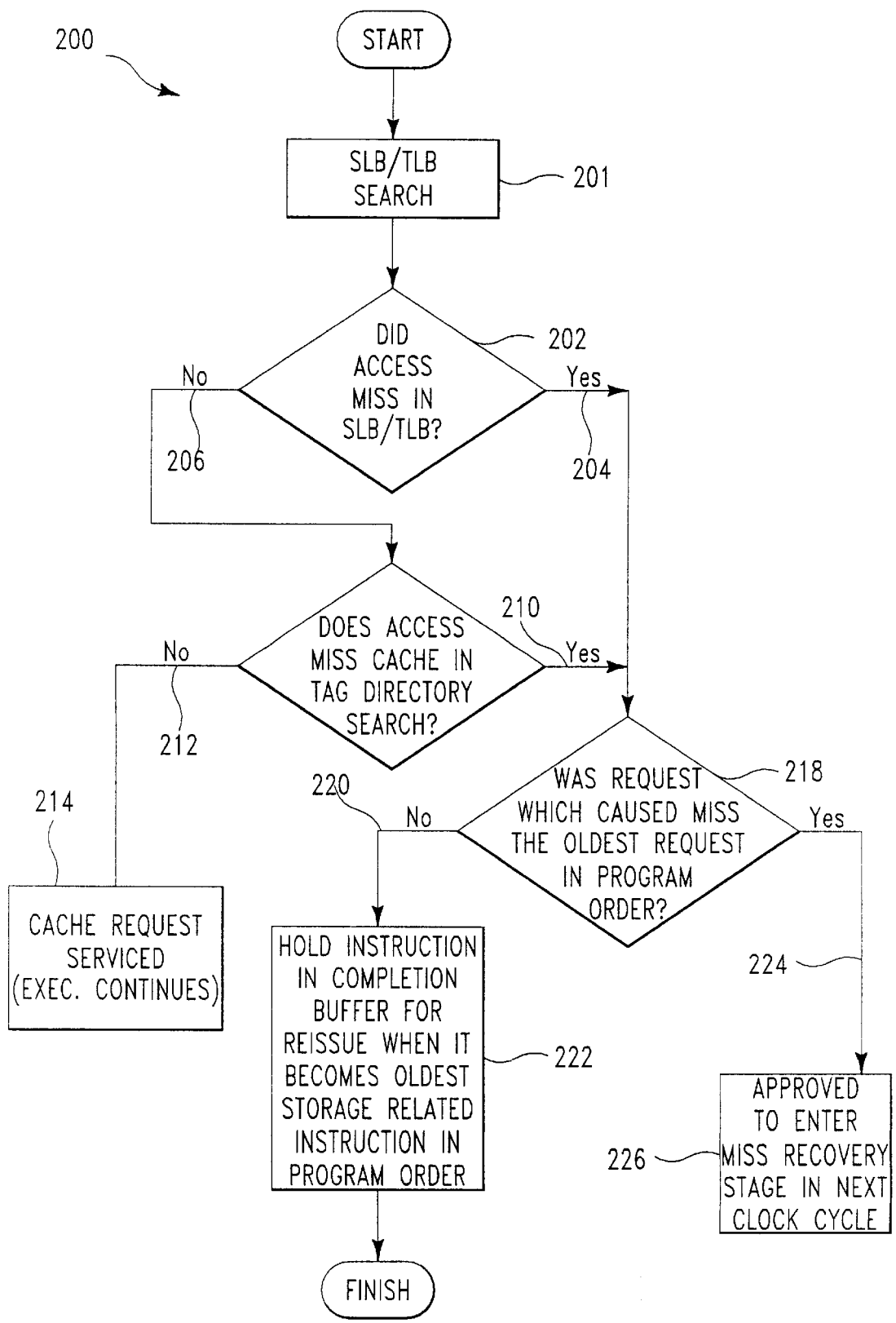
FIG. 4 is a flow diagram of a first pass through the access stage shown in FIG. 2.

FIG. 4 is a flow diagram of a first pass through the access stage 200 shown in FIG. 2. With reference to FIGS. 4 and 7, in block 201 the translation unit uses virtual addresses of the STORE target to search the SLB 428 and TLB 426 in order to return the corresponding real address. Test block 202, directs the action in accordance with whether or not the access "missed" in either the SLB 428 or the TLB 426 (e.g. the target address was not found).

If the SLB 428 and TLB 428 accesses each result in "hits" (e.g. the target address is found), the translation is completed and path 206 is taken. The real address returned is forwarded to the cache for a tag directory search. If the tag directory search results in a hit, the cache request is serviced at block 214. That is, the cache completes request protection checking, coherence state checking and parity checking based on the real address. In this case, execution continues with PASS 2, explained below.

If either the SLB 428 or the TLB 426 access results in a miss (e.g. the target address is not found), or if the SLB/TLB accesses result in hits, but the cache directory search results in a miss, respective paths 204 and 210 merge at test block 218 where it is determined by the completion buffer 416 whether the instruction causing the miss is the oldest cache/TLB request in program order (e.g. the most senior storage related instruction as indicated by the instruction tag). If the request is the oldest storage related instruction in program order, execution continues on path 224 and the instruction is approved in block 226 to continue to the miss recovery stage in the next clock cycle to manage the TLB or cache miss. If the request is not the oldest in program order (e.g. indicating that it is out of sequence), path 220 is taken and at block 222 the instruction is held by the completion buffer 416 for reissue when it is the oldest storage related instruction in program order.

FIG. 6 is a flow diagram 300 of the miss recovery stage shown in FIG. 2 entered as a result of test block 218 of FIG. 4 determining that an instruction causing a cache or SLB/TLB miss is the oldest storage related instruction in program order. At block 302, full translation of the virtual address to a real address is performed (e.g. by performing a full table walk).

At test block 304, it is determined whether the translation process completed without any exceptions. The occurrence of an exception implies that further action must be taken before a real address can be determined (e.g. paging data into memory from a disk drive). If an exception occurs, path 305 is taken; at block 306 the CMMU notifies the processor core 410 and the processor core 410 returns the exception. If no exceptions occur, path 307 is taken at block 308, and the translated address is placed into space newly allocated in the TLB. TLB Eviction Snoop Control Logic 425 detects when a translation has been evicted from the TLB/SLB (e.g. updated) and transmits a signal EVICTION_PRESENT indicative of the presence of an eviction in the TLB/SLB to the completion buffer 416, along with a signal TAG, indicative of the instruction tag of the instruction which caused the eviction. In response to the signals EVICTION_PRESENT and TAG, at block 310 the completion buffer 416 flushes (e.g. removes) all storage related instructions, except the current one. At block 312, the completion buffer 416 causes the current storage related instruction to repeat the PASS 1 storage access steps now that the new translation is in the SLB/TLB.

In PASS 2, the instruction again undergoes the arbitration stage in the same manner described above with respect to PASS 1. However, the PASS 2 ACCESS stage, shown in FIG. 5, results in an unconditional write to cache or memory, depending on the type of cache protocol applied.

Referring to FIG. 8 there is shown a high level timing diagram of an exemplary sequence of storage instructions performed in accordance with the method and apparatus of the present invention. The program order of the instructions is (1) LOAD, (2) STORE, (3) STORE, and (4) LOAD. In FIG. 8, sequential clock cycles are separated by vertical lines and the stages are identified by name as well as the reference numerals shown in FIGS. 2, 3, 4 and 5. In clock cycle 1, the CMMU 412 arbitrates pending requests and selects the first LOAD instruction; both the cache and the SLB/TLB are available and the ARB stage is complete.

In clock cycle 2, the first LOAD instruction proceeds to the ACCESS stage, in which the SLB/TLB search 201 produces both SLB/TLB (202, 206) and cache (+208, 212) hits and the request is serviced. That is, the data is fetched from the cache 420 and sent to the processor 410. Also in clock cycle 2, the second STORE instruction begins a first pass of execution in the arbitration stage 100 out of sequence (e.g. ahead of the first store instruction) since the operands for the first STORE instruction are not ready.

In clock cycle 3, the operands of the first STORE instruction having become available, the first STORE instruction begins a first pass of execution in the arbitration stage. In the same cycle, the second STORE instruction misses in the ACC stage (PASS1) as described above with reference to FIG. 4. The miss may be characterized as a SLB/TLB miss or a cache miss.

In clock cycle 4, the first STORE instruction misses in the ACC stage (PASS1). The second STORE instruction, which had also missed in the ACC stage in the previous clock cycle is not permitted to advance to the miss recovery stage in clock cycle 4 because it is not the oldest request in program order; the second STORE instruction is a junior instruction to the first STORE instruction.

In clock cycle 5, the first STORE instruction advances to the miss recovery stage 300 as described above with reference to FIG. 5. Since the first STORE instruction is the oldest in program order (e.g. most senior), it is permitted to enter the miss recovery stage 300 in the next clock cycle after the miss occurred (e.g. miss was in cycle 4, miss recovery in cycle 5). The miss recovery stage may require multiple clock cycles. Therefore, clock cycle 5 is also numbered as clock cycle N−1, where N represents the number of cycles required to complete the miss routine.

In clock cycle N, after the first STORE instruction has completed the miss recovery stage, the first STORE instruction begins PASS2, starting with another arbitration stage 100.

In clock cycle N+1, the first STORE instruction completes PASS2 as it completes the ACC stage, resulting in an unconditional write to cache or memory. Also in clock cycle N+1 the second STORE instruction is re-issued, starting execution again with PASS 1 ARB.

In clock cycle N+2, the second STORE instruction misses in the PASS1 ACCESS stage and the second LOAD instruction is arbitrated.

In clock cycle N+3, the second STORE instruction immediately enters the miss recovery stage 300 since it is now the oldest instruction in program order. At the same time, the second LOAD instruction successfully completes the ACCESS stage. In the ensuing clock cycles, execution continues similarly.

In alternate embodiment of the present invention, the step at block 310 of FIG. 6 can be modified to perform a conditional flush. More particularly, the CMMU 412 could provide status information to the completion buffer 416 indicating when a STORE instruction completes PASS 1. Status information of this type would then be used by the completion buffer 416 to conditionally flush all instructions but the current instruction if a PASS 1 STORE instruction is detected.

Similarly, in another embodiment of the present invention, the step at block 310 can be modified to selectively flush. More particularly, the completion buffer 416 or another execution unit would monitor the TLB/SLB index and way for each instruction. Upon a TLB/SLB eviction (e.g. update), only those STORE instructions having the same index and way would be flushed.

While the invention has been particularly shown and described with reference to preferred embodiments thereof, it will be understood by those skilled in the art that various other changes in form and detail may be made therein without departing from the spirit and scope of the invention.

What is claimed is:

1. A computer system including a processor and a cache and memory management unit, the processor including a means for retiring instructions in program order, the cache and memory management unit including a cache and further including a lookaside buffer for translating virtual addresses to and from real addresses, the processor and cache and memory management operating to execute storage related instructions in multiple passes of execution, wherein:

the cache and memory management unit includes means for detecting when a translation has been evicted from the lookaside buffer and means for communicating eviction information to the means for retiring instructions in program order;

the means for retiring instructions in program order includes means for holding a storage related instruction which causes a miss in the lookaside buffer or in the cache in a first pass of execution until the instruction becomes the oldest storage related instruction in program sequence and further includes means responsive to the eviction information for flushing all storage related instructions except the current storage related instruction.

2. The system of claim 1 wherein the lookaside buffer comprises a translation lookaside buffer.

3. The system of claim 1 wherein the lookaside buffer comprises a segment lookaside buffer.

4. The system as claimed in claim 1, wherein said means for detecting when a translation has been evicted from the lookaside buffer includes eviction snoop control logic.

5. The system as claimed in claim 1, wherein said eviction information includes a signal EVICTION_PRESENT.

6. The system as claimed in claim 5, wherein said eviction information further includes a signal TAG.

\* \* \* \* \*